United States Patent [19]

Graham

[11] Patent Number: 4,739,141

[45] Date of Patent: Apr. 19, 1988

[54] APPARATUS FOR MAKING ORNAMENTAL METAL RAILINGS

[76] Inventor: Wayne F. Graham, 8 Hatch St., Everett, Mass. 02149

[21] Appl. No.: 907,374

[22] Filed: Sep. 15, 1986

[51] Int. Cl.⁴ .............................................. B23K 1/00
[52] U.S. Cl. ..................................................... 219/56
[58] Field of Search ............... 29/33 R, 33 B, DIG. 3, 29/428, 429, 432.1, 400 R, 400 M, 400 D; 228/155, 164, 5.1, 7, 102, 173.5, 6.1; 219/56, 53, 57, 125.1, 125.11, 58, 87, 79

[56] References Cited

U.S. PATENT DOCUMENTS 4,539,457  9/1985  Pinger et al. ........................... 219/58

Primary Examiner—Clifford C. Shaw
Assistant Examiner—Huan H. Tran
Attorney, Agent, or Firm—John P. McGonagle

[57] ABSTRACT

An apparatus for making ornamental metal railings whereby controlled vertical bends in the railing may be made and parallel arrangements of pickets and posts maintained. One-half of the apparatus may be arced about the other half of the apparatus. The top and bottom rails of a railing are passed through automatic and adjustable guide means to welding zones, one zone for each rail. Pickets and posts are individually placed into piece holders which position the picket or post against each of the rails within the welding zones.

12 Claims, 6 Drawing Sheets

READY POSITION

RESET POSITION

APPARATUS FOR MAKING ORNAMENTAL METAL RAILINGS

BACKGROUND OF THE INVENTION

This invention relates to welding machines with means to juxtapose and bond plural workpieces, and particularly to an apparatus for making ornamental metal railings.

Ornamental metal railings most commonly consist of top and bottom rails interconnected by means of pickets and posts in a generally parallel arrangement with each other. The metal railings have a two-fold purpose, i.e., ornament and safety. The railings are used along raised landings, flights of stairs, and pathways. A length of railing may be any length. Ideally, the length of railing will accomodate vertical level changes along flights of stairs to and from landings. More subtle vertical level changes may be required for pathways. For safety, a strong welding technique should be used, e.g., a 100% weld about the juncture of pieces being joined rather than a partial weld. With a 100% weld, the railings will be stronger, will look better, and will resist rust by shedding water about the juncture of welded pieces.

Heretofore, metal railings usually have been manually assembled with pickets and posts being spot welded with partial welds to the top and bottom rails. Vertical bends in rails are done either by manually heating and bending the rails to a desired vertical angle, or by joining separate lengths together to form a desired vertical angle. Present methods of making ornamental railings are typically time consuming and inconsistent, with safety and cosmetic appearance often sacrificed.

SUMMARY OF THE INVENTION

The present invention is an apparatus for forming ornamental metal railings. The top and bottom rails are passed through automatic and adjustable guide means to welding zones, one zone for each rail. Each welding zone consists of two welding units with nozzles, the actual welding and heating operations being done via the nozzles. Pickets and posts are individually placed into piece holders which position the picket or post against each of the rails within the welding zones. Metal-inert gas, tungsten-inert gas, or similar type welding which melts wire and bonds picket or post to each of the rails is used. Each of the welding nozzles within a welding zone is so positioned that a 100% continuous weld about the picket or post at the abutment of picket or post to rail is formed. The base of the apparatus is so configured that one-half of the apparatus may be arced in one-tenth degree segments about the other one-half of the apparatus. This arcing feature, combined with heating in the welding zones, provides controlled and consistent bending to the railing. The design of the apparatus provides picket and post positioning after bending parallel to picket and post positioning prior to bending.

DETAILED DESCRIPTION OF THE INVENTION

Figure 1:
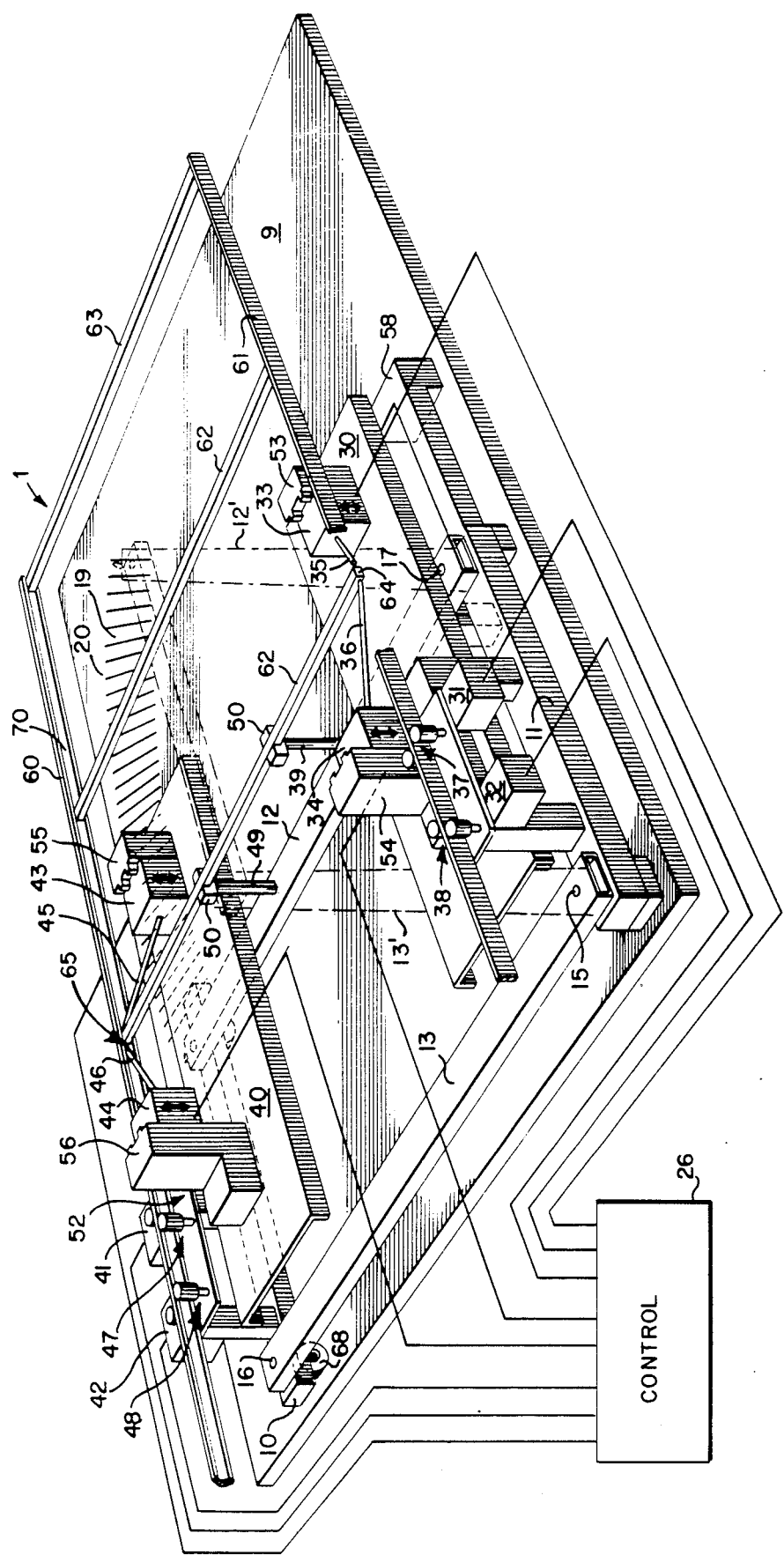
FIG. 1 is a perspective view of the apparatus, with one rail partially cut away, constructed in accordance with the invention.
Figure 2:
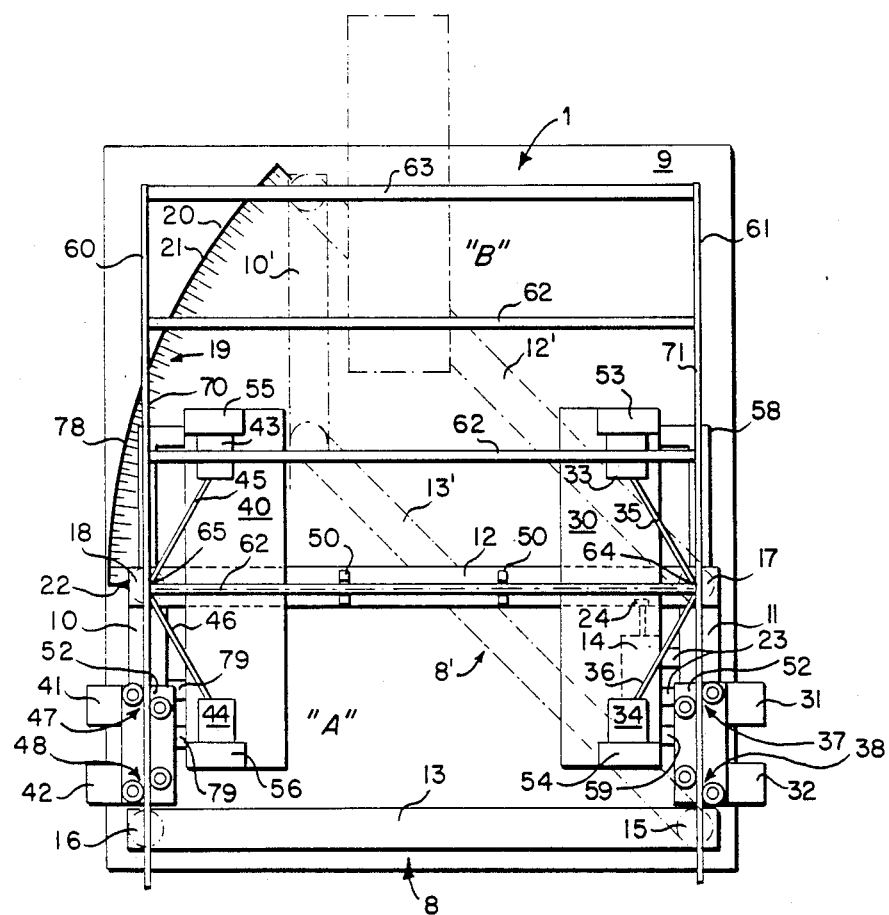
FIG. 2 is a top plan view of the apparatus forming a straight length of railing.
Figure 3:
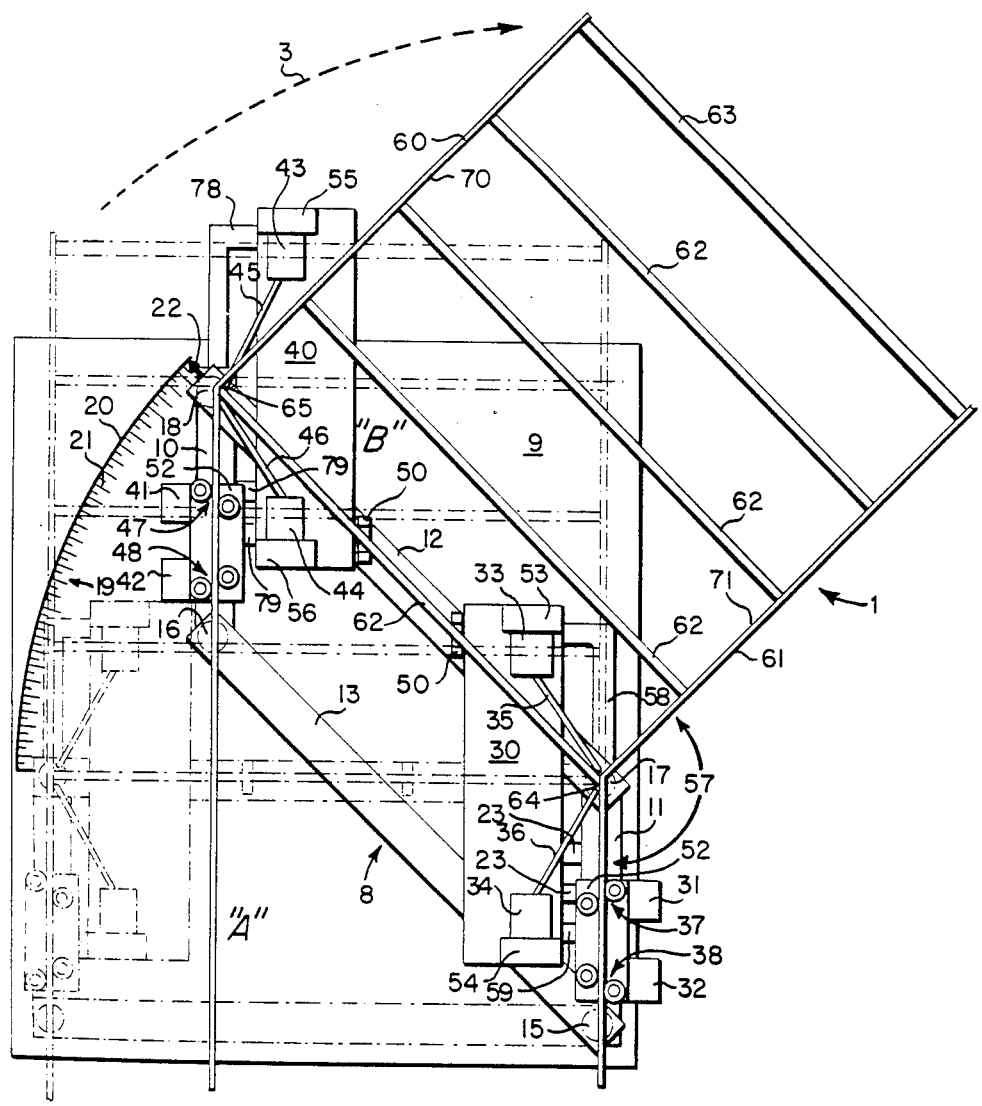
FIG. 3 is a top plan view of the apparatus in position during a bending operation.
Figure 4:
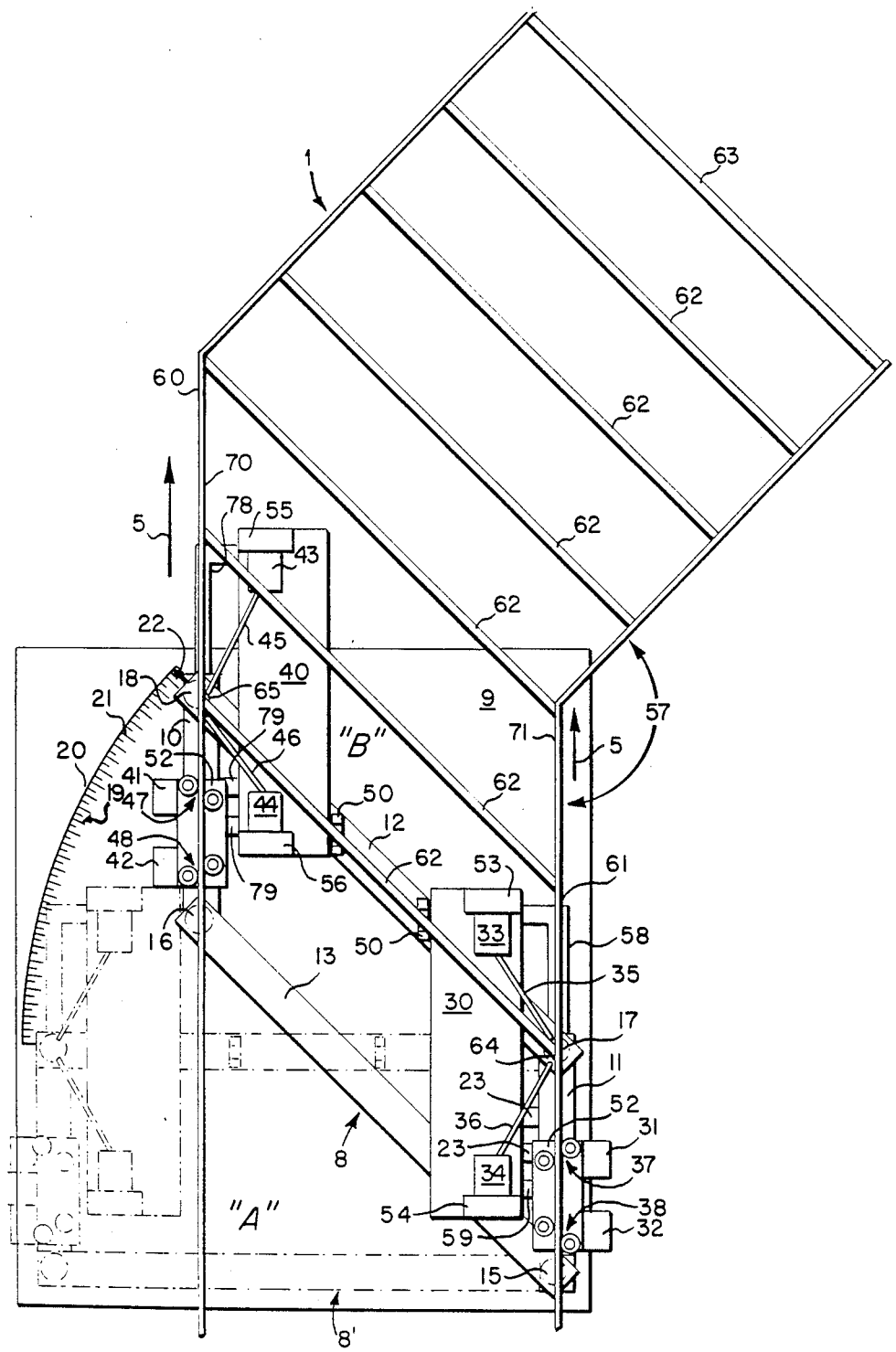
FIG. 4 is a top plan view of the apparatus forming railing after a bending operation.
Figure 5A:
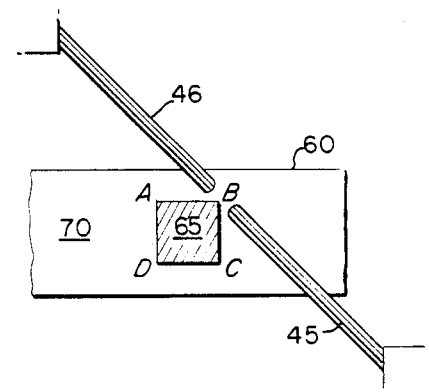
FIGS. 5A through 5E are diagrammatic views of typical welding paths along the top rail.
Figure 5B:
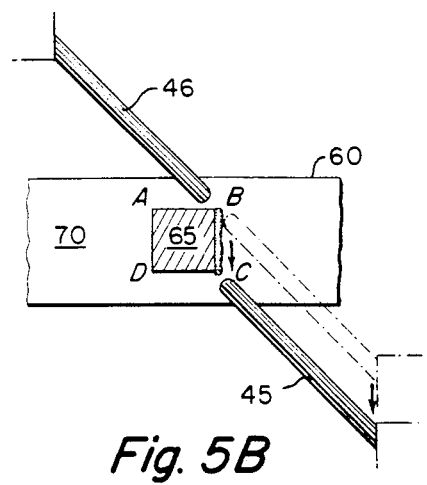
Figure 5C:
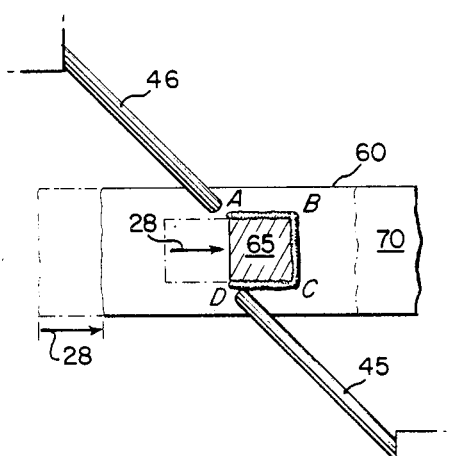
Figure 5D:
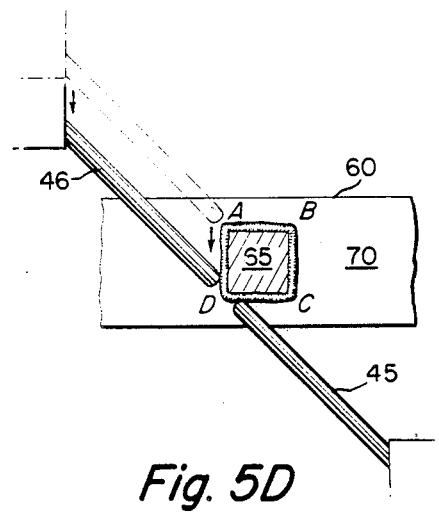
Figure 5E:
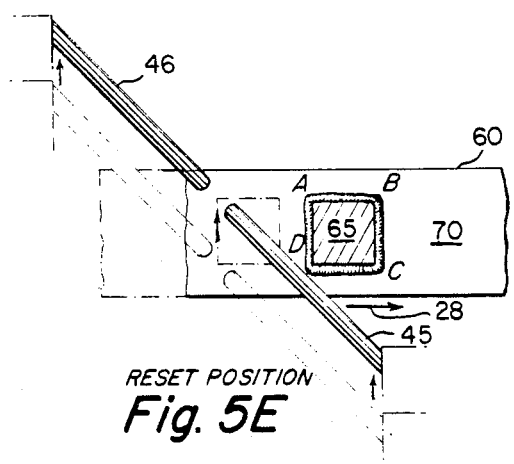

Referring more particularly to the drawings in detail wherein like numerals indicate like elements, FIG. 1 represents a perspective view of the apparatus constructed in accordance with the present invention, and FIGS. 2, 3, and 4 represent top plan views of the apparatus in various stages of operation. The base of the invention is moveable from Position A to Position B, wherein Position B represents the invention in any position other than the invention's zero degree position, i.e., Position A. FIG. 2 shows the apparatus in Position A with Position B represented in broken lines. FIGS. 3 and 4 show the apparatus in Position B with Position A represented in broken lines. In this embodiment of the invention, Position B's maximum extension is forty-five degrees. The base consists of a flat metallic floor 9, two parallel members 10 and 11 of equal length, two parallel crossbars 12 and 13 also of equal length, and means 14 for moving the crossbar 12 to the position denoted as 12'. The crossbars 12 and 13 are pivotally connected to the members 10 and 11 near the extremities of the members 10 and 11 at the junctures 15, 16, 17 and 18. The base member 11 on the right is permanently fixed in place to the floor 9, never moving. The base member 10 on the left is moveable across the apparatus floor 9 with its forward extremity near the juncture 18 moveable along the arc 20, and having as its pivot point the juncture 17. The base members 10 and 11 and crossbars 12 and 13 form a parallelogram 8 whether in the rectangular Position A or in Position B. As may be most clearly seen in FIG. 2, the parallelogram 8 is driven from Position A to Position B along the arc 20 by an air piston 14 fixedly attached with brackets 23 to the right base member 11, and pivotally attached to the forward crossbar 12 at 24. The air piston drives the forward crossbar 12 until it is in the desired position denoted as 12'. Because of the pivotal junctures at 15, 16, 17 and 18, and the left member's 10 moveability, the entire parallelogram 8 moves from Position A to the desired Position B. The crossbars 12 and 13 are denoted 12' and 13' respectively, and the left base member 10 as 10', when the parallelogram 8 is in Position B. Along and adjacent to the arc 20 is a scale 19 in tenths of angle degrees from zero degrees to forty-five degrees. Fastened to the scale 19 are sensor switches 21 which control the amount of advance or withdrawal of the air piston 14. Attached to the left extremity of the forward crossbar 12 is a marker 22 which serves to both visually indicate the number of angle degrees on the scale 19 the parallelogram 8 has moved and also as an activator for the sensor switches 21.

There is also shown in FIGS. 1 through 4 two, generally rectangular tables 30 and 40 with longitudinal axes generally parallel to the base members 10 and 11. The right table 30 is positioned to the inside of and fixedly attached to the right base member 11 by means of an "L" shaped bracket 58 and an angle bracket 59. The right table 30 slideably rests on the crossbar 12 at the table's 30 approximate midpoint while the parallelogram 8 is in Position A. The left table 40 is positioned inside of and fixedly attached to the left base member 10 by means of an "L" shaped bracket 78 and angle brackets 79. The left table 40 also slideably rests on the forward crossbar 12 at the table's 40 approximate midpoint while the parallelogram 8 is in Position A. The relationships of the right 30 and left 40 tables to the base members 11 and 10 respectively do not change whether in Position A or Position B, although their positions with respect to the forward crossbar 12 change as the parallelogram 8 moves into Position B from position A.

Referring again to FIGS. 1 through 4 there are shown two sets of roller guides 37, 38 and 47, 48 mounted to and above the base members 11 and 10 respectively. The roller guides 37, 38 and 47, 48 hold the bottom 61 and top 60 rails of the railing 1. A railing 1 in this embodiment of the invention consists of a top rail 60 and a bottom rail 61 interconnected with pickets 62 and posts 63. The bottom rail 61 is a long, generally flat strip of iron. The roller guides 37 and 38 hold the bottom rail 61 on edge. The bottom rail's 61 longitudinal axis is parallel to the right base member 11 in a horizontal plane above the right base member 11. The roller guides 37 38 position the inner surface 71 of the bottom rail 61 slightly outside of the center points of the junctures 15 and 17. The rail 61 is positioned approximately six inches above the right base member 11. The top rail 60 is a long thin strip of iron with its bottom side 70 approximately flat with a slightly concave shape to hide the welds and with its top side generally shaped in a decorative molding style. The roller guides 47 and 48 hold the top rail 60 on edge with the rail's 60 longitudinal axis parallel to the left base member 10 in a horizontal plane above the base member 10. The top rail's bottom side 70 faces the bottom rail's inner surface 71. The roller guides 47 and 48 position the rail 60 slightly outside of the center points of the junctures 16 and 18. The top rail 60 is also positioned approximately six inches above the left base member 10 in the same horizontal plane as the bottom rail 61.

Mounted on the forward crossbar 12 between the tables 30 and 40 are two swivel piece holders 39 and 49 with variably shaped jaws or guides 50. The holders 39 and 49 hold in place a picket 62 or post 63 such that the picket 62 or post 63 touch the inner surfaces 70 and 71 of the top 60 and bottom 61 rails over the approximate midpoints of the junctures 18 and 17 respectively. The pickets 62 and posts 63 are elongated, thin pieces of iron having generally square cross-sections.

There are also shown on each table 30 and 40 two welding units 33, 34 and 43, 44 respectively. Each welding unit 33, 34, 43 and 44 has a nozzle 35, 36, 45 and 46 respectively protruding from it from which nozzles come the welding heat, gases and bonding wire. The nozzles 35 and 36 of welding units 33 and 34 are aimed at the junction 64 of the picket 62 or post 63 with the bottom rail 61. An example of this is shown in FIG. 1 at the juncture 64 where the rail 61 is cut away for exposition purposes. The nozzles 45 and 46 of welding units 43 and 44 are aimed at the junction 65 of the picket 62 or post 63 with the top rail 60.

FIGS. 2 through 4 show the railing 1 formation in detail. FIG. 2 shows a straight length of railing 1 being formed. The pickets 62 are approximately twenty-eight inches long and spaced five inches apart. The top 60 and bottom 61 rails 61 are moved into the roller guides 48, 47 and 38, 37 respectively. The leading edge of each rail 60 and 61 is brought to the mark 52 on each of the forward roller guides 47 and 37. When the rails 60 and 61 are properly aligned, automatic operation is initiated. Both sets of roller guides 48, 47 and 38, 37 synchronously advance the top 60 and bottom 61 rails. When the rails 60 and 61 have advanced a predetermined distance, the roller guides 48, 47, 38, and 37 stop. A picket 62 or post 63 is placed onto the piece holders 39 and 49, and the welding sequence takes place. When the welding sequence (described in detail below) is completed, the roller guides 48, 47, 38, and 37 again synchronously advance the top 60 and bottom 61 rails a predetermined distance and stop. A picket 62 or post 63 is again placed onto the piece holders 39 and 49 and the welding sequence takes place. The piece holders 39 and 49 are designed so that their jaws or guides 50 are spring adjustable to accomodate pickets 62 and posts 63 of varying widths. The jaws or guides 50 are also designed so that as a completed section of railing 1 advances, the welded piece (picket 62 or post 63) is released from the jaws or guides 50.

The above process continues until a vertical angle 57 change in the railing 1 is to be introduced. As can be most clearly seen in FIG. 3, the air piston 14 of FIG. 2 is activated moving the base parallelogram 8 along the arc 20 from Position A to Position B a predetermined number of angle degrees as measured along the scale 19 by the sensor switches 21 activated by the marker 22. Simultaneously during this movement, the rails 60 and 61 are heated over the junctures 17 and 18 allowing the rails 60 and 61 to bend in the direction shown by the broken arrow 3 as the base parallelogram 8 moves. The piece holders 39 and 49 swivel with the movement of the forward crossbar 12 maintaining pickets 62 and posts 63 after bending parallel to pickets 62 or posts 63 positioned prior to bending. As stated previously, the left base member 10 is moveable. This may be most clearly understood in FIG. 1. Heavy duty swivel caster wheels 68 are attached beneath the left base member 10 and "L" bracket 78. This permits relatively free movement of the left base member 10 as the forward crossbar 12 is driven back and/or forth by the air piston 14. After the bend of FIG. 3 is made and the desired vertical angle 57 in the railing 1 is obtained, additional pickets 62 are added to the railing 1 as shown in FIG. 4. The direction of movement of the railing 1 is indicated by the broken arrow 5. The pickets 62 added to the railing 1 during this stage are parallel to the pickets 62 inserted during the initial operation shown in FIG. 2.

Visible most clearly from FIG. 1 are the relative positionings of the welding units 33, 34, 43 and 44. Because the railing 1 advances forward, the tops of the forward welding units 33 and 43 must be in a horizontal plane beneath the horizontal plane in which the railing 1 is being formed. This permits the railing 1 to advance without striking the forward welding units 33 and 43. The tops of the rear welding units 34 and 44 lie in a horizontal plane above that of the railing's 1 horizontal plane. This ensures a complete weld of the picket 62 and/or posts 63 to the top 60 and bottom 61 rails.

Figure 6:
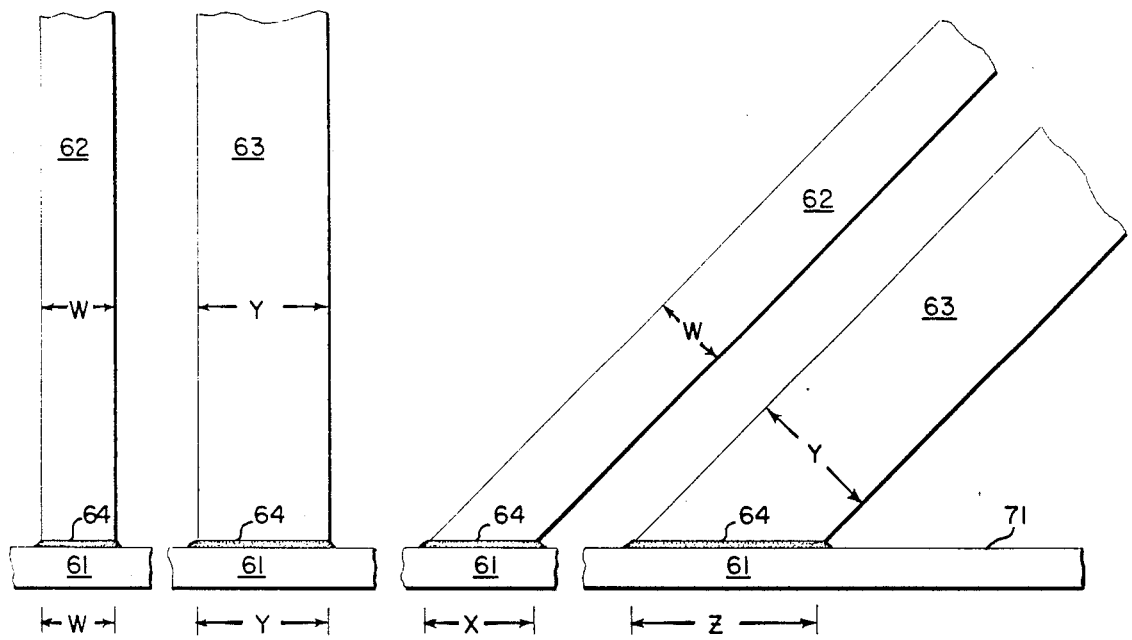
FIG. 6 is a diagrammatic view of surface contacts of pickets and posts on the bottom rail.
Figure 7:
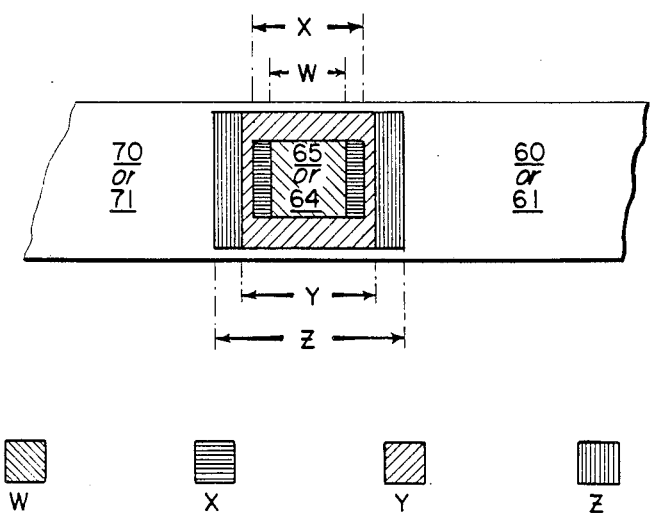
FIG. 7 is a diagrammatic view of the alternate welding paths along either the top or bottom rails.

The welding operation may be more clearly understood from FIGS. 5 through 7. FIGS. 5A through 5E depict the bonding of one end of a picket to the top rail 60. Movement of the top rail 60 is from left to right. The picket's juncture 65 with the top rail's inside surface 70 is shown in plane cross-section A-B-C-D. The picket 62 is placed in position on the holders 39 and 49. The lead side of the picket 62 is depicted as side B-C. At the start of the welding sequence [FIG. 5A], the welding nozzles 45 and 46 are aimed at point B of the picket's 62 cross-section as it abuts the top rail's inside face 70. The welding units 43 and 44 from which the nozzles 45 and 46 protrude are vertically adjustable under control 26 by conventional means such as ball bearing slide table or similar means driven by air pistons. In step 1 [FIG. 5B] of the welding sequence the lower welding nozzle 45 is activated and is moved vertically downward bonding the picket 62 to the rail 60 along the line B-C. When the nozzle 45 reaches point C, step 2 begins. Step 2 [FIG. 5C] begins with the upper welding nozzle 46 being activated and the top rail 60 moving from left to right along the direction depicted by the arrows 28. The picket 62 will move with the railing 60 due to the holding power of the weld along the line B-C. During the picket's 62 movement, the upper welding nozzle 46 bonds the picket 62 along line B-A, and the lower nozzle 45 bonds the picket 62 along the line C-D. When the picket 62 has moved a picket width B-A or C-D, the lower nozzle 45 deactivates, the rail's 60 movement halts, and the upper nozzle 46 moves vertically downward bonding the picket 62 to the rail 60 along the line A-D [FIG. 5D]. The upper nozzle 46 then ceases welding. The rail 60 moves from left to right a predetermined distance and both welding nozzles 45 and 46 simultaneously rise in preparation for a new welding sequence [FIG. 5E]. This sequence is simultaneously mirrored on the other side with the picket 62 being bonded at its other end to the bottom rail 61. The same procedure is followed whether a picket 62 or a post 63 is being bonded, and whether or not the apparatus is in Position A or in Position B. In some railing 1 forms, the posts 63 may protrude through the bottom rail 61. Even in these situations, the welding sequence remains the same.

FIGS. 6 and 7 diagrammatically show the actual surface contact of a picket 62 and a post 63 on the bottom rail 61 in Position A and Position B. The control 26 is programmed to adjust welding unit 33, 34, 43 and 44 and rail 60 and 61 movement for these changes and variations. As may be seen in these two Figures, the surface contact varies from minimum contact with a picket 62 in Position A to a maximum contact with a post 63 in position B. The typical rail 60 or 61 is a one-quarter by one inch flat bar or molding. The typical picket is usually one-half inch per cross-section side. A post 63 has a cross-sectional side of up to seven-eighths of an inch. FIG. 7 shows the variation in welding routes possible for pickets 62 and posts 63 in a typical welding operation for various picket 62 and post 63 sizes and various Positions A and B. "W" represents the contact surface for a picket 62 in Position A. "X" represents the contact surface for the same picket 62 in Position B. "Y" represents the contact surface for a post 63 in position A. "Z" represents the contact surface for the same post 63 in Position B.

The sensor switches 21, rail 60 and 61 movement, air piston 14 movement, and welding sequence are controlled by means of a standard process controller 26 most clearly visible in FIG. 1. Process controllers are common in the art and need not be discussed here. Vertical movement of the welding units 33, 34, 43 and 44 in this embodiment are along track blocks 53, 54, 55 and 56 respectively. The vertical movement is done in this embodiment by means of pneumatics controlled and synchronized by the controller 26. The rotary movement of the roller guides 37, 38, 47, and 48 is controlled by simple gearing 31, 32, 41 and 42 respectively also controlled and synchronized by the controller 26.

It is understood that the above described embodiment is merely illustrative of the application. Pneumatics could easily be replaced with hydraulics, electrical or magnetic systems. Switches and sensors may be of various types. The caster wheels 68 could easily be replaced with some other type of sliding means.

I claim:

1. An apparatus for making ornamental metal railings consisting of generally flat, bar-like rails, pickets and posts, comprising in combination:

a base with front, rear and two sides, a flat bottom surface, two parallel base members of equal length, one on each side, one of which is fixedly attached to said bottom surface, and the other of which moveably rests on said surface, and two parallel crossbars, one forward and one rearward, of equal length, pivotally connected to the members near the extremities of the members and the crossbars;

two tables mounted on said base, each table being attached to a separate base member;

means for orienting the moveable base member and two crossbars so that one table may be moved in a partial arc about the other table;

workpiece guides for positioning, holding and moving rails on both sides of the base;

workpiece holders for positioning and holding pickets or posts so that each end of the picket or post touches a rail; and welding means mounted on each table and positioned to operate on the touch point of a picket or post and rail.

2. An apparatus as recited in claim 1 wherein:

the tables have generally rectangular shapes with their longitudinal axes generally parallel to the base members; are fixedly attached one each to the inside of each base member; and are positioned so that their undersurfaces are in a plane parallel to the plane of the bottom surface.

3. An apparatus as recited in claim 2 wherein: the tables are positioned over the forward crossbar and are positioned so that their midpoints along their longitudinal axes are abreast of their respectively attached member's forward extremity.

4. An apparatus as recited in claim 3 wherein the workpiece guides for positioning, holding and moving rails on both sides of the base comprise:

a plurality of vertical support members attached to the base members;

a plurality of rollers on each support member for positioning, holding and moving a rail alongside, parallel to, and over a base member; and means for turning the rollers such that the rails move simultaneously in a forward direction.

5. An apparatus as recited in claim 4 wherein:

the rollers are positioned so that the upper and lower rails are parallel to each other in the same horizontal plane, and the flat surfaces of each rail lie in planes generally parallel to each other.

6. An apparatus as recited in claim 5 wherein the workpiece holders for positioning and holding pickets or posts so that each end of the picket or post touches a rail comprise:

a plurality of vertical support members attached to the forward crossbar; and adjustable jaws on each support member for holding a picket or post so that each end of a picket or post touches a flat surface of the upper and lower rails approximately over the pivotal connection of the forward crossbar with a base member.

7. An apparatus as recited in claim 6 wherein the welding means mounted on each table and positioned to operate on the touch point of picket or post and rail comprises:
   two welding units on each table, one positioned to the front and one positioned to the rear of each table, as defined along the table's longitudinal axis, the front units having a maximum height below the horizontal plane of the picket or post;
   a welding nozzle extending from each welding unit toward and adjacent to the touch point of picket or post and rail over the base member to which the particular table is connected, the nozzles of the rear units being positioned above the horizontal plane of the picket or post; and
   means for moving the welding units vertically upward and downward.

8. An apparatus as recited in claim 7 wherein:
   the means for orienting the moveable base member and two crossbars so that one table may be moved in a partial arc about the other table is a pneumatic piston, fixedly attached to the fixedly attached base member, and pivotally attached to the forward crossbar.

9. An apparatus as recited in claim 8 wherein the means for turning the rollers such that the rails move simultaneously in a forward direction comprise:
   simple gearing controlled and synchronized by a standard process controller.

10. An apparatus as recited in claim 9 wherein:
    the means for moving each welding unit vertically upward and downward are pneumatics controlled and synchronized by said controller.

11. An apparatus as recited in claim 10 further comprising:
    means for coordinating and controlling the movement of said pneumatic piston, rails, and welding units.

12. An apparatus as recited in claim 11 wherein:
    the means for coordinating and controlling the movement of said pneumatic piston, rails and welding units is said standard process controller.

* * * * *